Dec. 20, 1960 R. F. BECK ET AL 2,964,959
ACCESSORY DRIVE TRANSMISSION
Filed Dec. 6, 1957 3 Sheets-Sheet 1

INVENTORS
Ralph F. Beck, &
BY Jack W. Quatman
W. C. Middleton
ATTORNEY

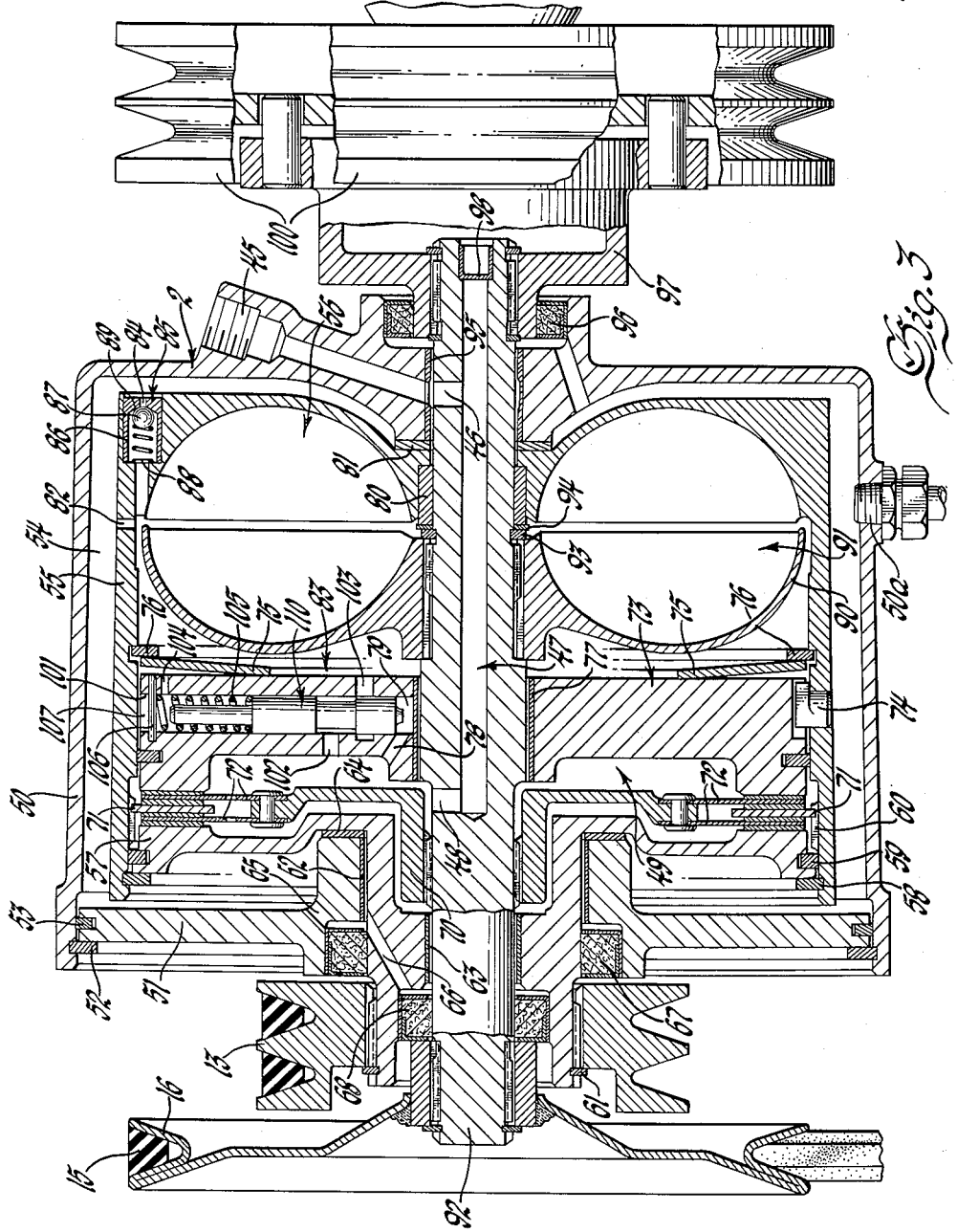

2,964,959
ACCESSORY DRIVE TRANSMISSION

Ralph F. Beck, Detroit, and Jack W. Qualman, Birmingham, Mich., assignors to General Motors Corporation, Detroit, Mich., a corporation of Delaware Filed Dec. 6, 1957, Ser. No. 701,105

14 Claims. (Cl. 74—336)

This invention relates to a multiple speed ratio transmission drive mechanism and more particularly to an accessory drive mechanism for use on automotive vehicles.

With the addition of multiple accessories such as power steering pumps, refrigeration compressors for air conditioning units, and air compressor pumps for air suspension, for example, it has become increasingly important to operate such unit to obtain adequate capacity and yet avoid excessive power consumption. Plural speed drive transmissions for such units have been unsatisfactory due to the roughness of shift from one drive ratio to another and because of "hunting" between the ratios of the accessory drive units. It will be apparent that at certain vehicle speeds as caused by heavy traffic in city driving, the shift from one drive ratio to another may be extremely frequent. As a result of this frequency of shift, conventional drive units have proven to be unsatisfactory and unacceptable due to the annoyance of the rough shift to the vehicle operator.

Accordingly, an object of our invention is to provide a plural speed ratio accessory drive mechanism which is capable of providing a smooth shift from one ratio to another without sudden "bumps" or torque reaction shocks.

Another object of our invention is to provide an accessory drive transmission adapted to drive the vehicle accessories at speeds wherein the accessories function at maximum efficiency and with minimum power consumption.

A further object of our invention is to provide an accessory drive transmission of the class described wherein shift of ratio is automatic and is accomplished without "hunting" and is extremely smooth in nature.

Another object of our invention is to provide a plural speed accessory drive transmission incorporating a hydraulic torque transfer unit, centrifugal valve means and a one-way clutch cooperating to provide a smooth transition of drive ratio in the transmission.

An additional object of this invention is to provide an accessory drive transmission for an automotive vehicle wherein the accessories are driven at a relatively fast speed of rotation with respect to the speed of rotation of the engine crankshaft whenever the crankshaft speed is less than a predetermined speed and wherein the accessory units are driven at a slower rate of speed with respect to the speed of rotation of the engine crankshaft whenever the speed of rotation of the crankshaft exceeds a predetermined speed of rotation.

A further object of our invention is to provide an accessory drive mechanism including an enginee driven power input unit and an accessory drive unit wherein power input from the power input unit to the accessory drive unit is automatically switched from a first torque path to a second torque path whenever the speed of the engine crankshaft exceeds a predetermined speed.

Another object of our invention is to provide a pulley drive mechanism for belt driven accessories wherein the power input to the accessories is initially accomplished through one set of belts and is automatically shifted to a second set of belts whenever the engine speed exceeds a predetermined speed of rotation.

A further object of our invention is to provide an accessory drive mechanism having a pair of power input pulleys wherein shift of drive from one pulley to another is accomplished smoothly without any abrupt torque changes.

Still another object of our invention is to provide centrifugal force responsive means for accomplishing a more rapid shift of drive ratio under conditions of rapid acceleration than occurs during conditions of normal acceleration.

These and other objects of our invention will be apparent from the following description and claims taken in conjunction with the accompanying drawings in which:

Figure 3 is a sectional view of the two-speed transmission unit; and

Figure 1:
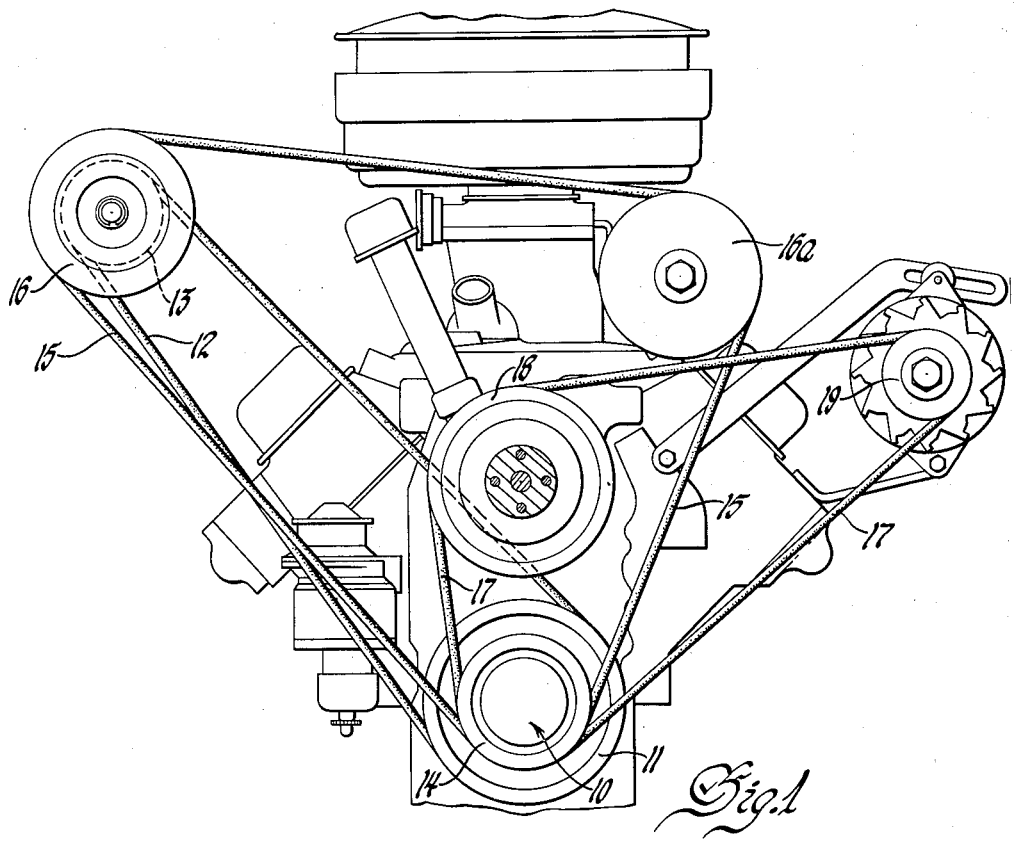
Figure 1 is a schematic diagram illustrating the location of the various drive pulleys and the belt drive connections whereby the accessories are driven.
Figure 4:
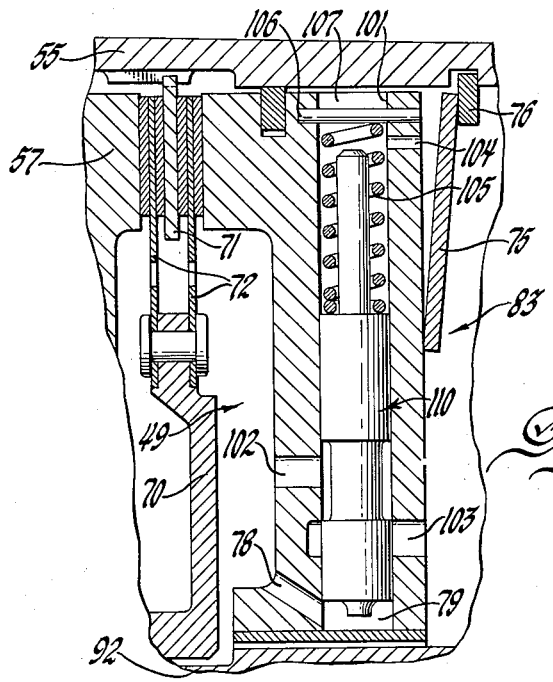
Figure 4 is an enlarged sectional view of the clutch piston and clutch of Figure 3.

As shown in Figure 1, a relatively large pulley 11 is fixed to a vehicle crankshaft 10 for rotation therewith. A belt 12 connects pulley 11 to a relatively small pulley 13. Pulley 13 is, therefore, driven by belt 12 at a speed faster than crankshaft 10 as determined by the relative diameters of pulleys 11 and 13. A second pulley 14 is at times driven by crankshaft 10 and at such times drives a belt 15 which extends around another pulley 16 and a pulley 16A which may be the drive pulley for a power steering pump. Pulley 13 is of smaller diameter than pulley 11 and pulley 16 is of greater diameter than pulley 14. Accordingly, when pulley 14 constitutes the power input pulley from the crankshaft to the accessories, the accessories will be driven at a speed slower relative to crankshaft speed than is the case when pulley 11 constitutes the power input pulley from the crankshaft. The speed ratio is determined by the relative pitch diameters of pulleys.

Pulley 14 also drives the water pump, fan and generator by means of a belt 17 which drives the water pump and fan pulley 18 and a generator pulley 19.

Figure 2:
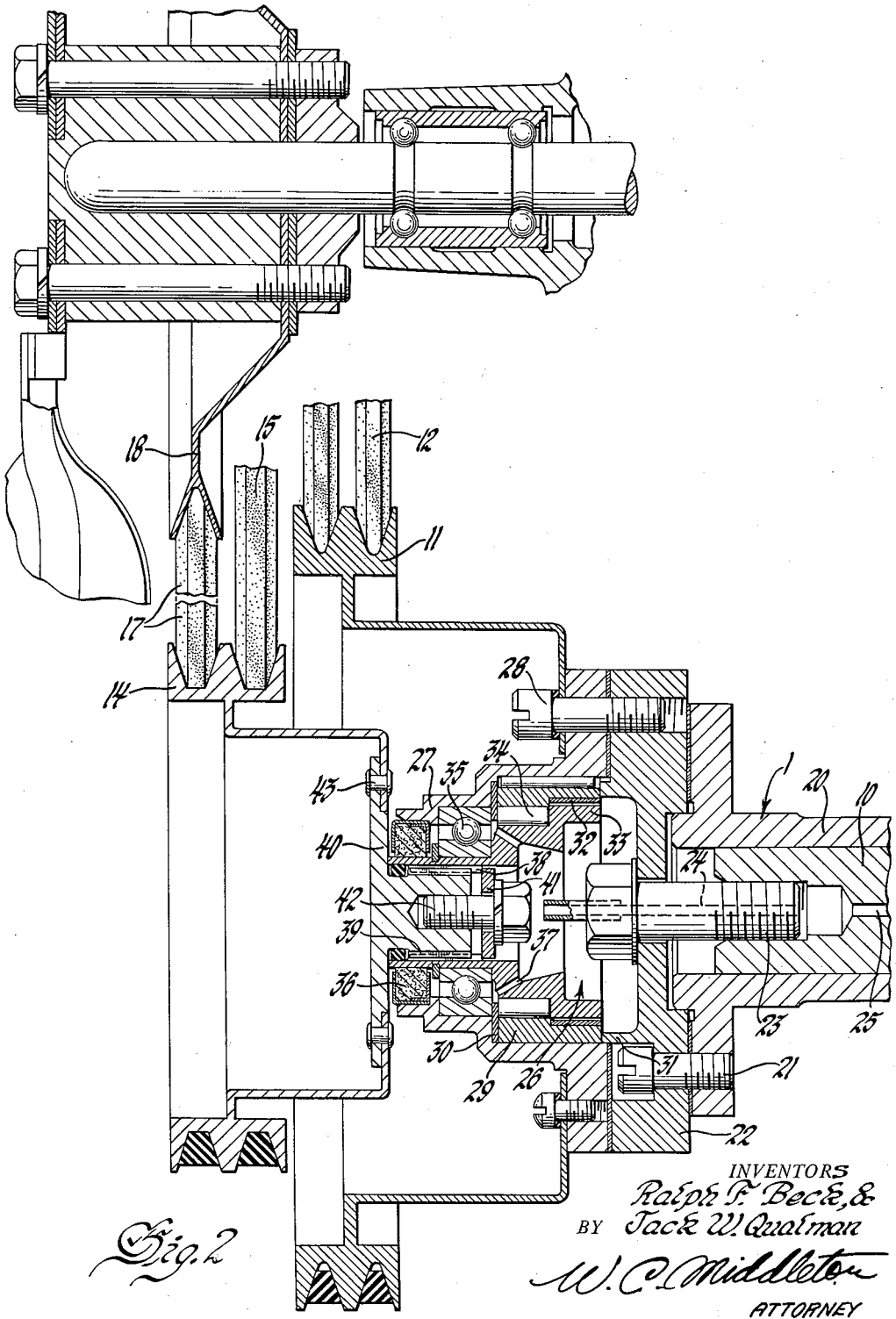
Figure 2 is a sectional view of the engine driven power input unit.

Referring to Figure 2, the details of power input unit 1 are shown. An engine driven power input shaft 10, which may be the crankshaft of an automotive vehicle engine, carries a drive hub 20 splined thereto, drive hub 20 being removably secured to a freewheel housing adapter 22 by means of a series of bolts or screws 21. Housing adapter 22 is detachably secured to engine crankshaft 10 by means of a bolt 23, the bolt 23 being drilled throughout its length to provide an oil lubrication passage 24 adapted to connect an oil supply passage 25 in crankshaft 10 to a chamber 26. A housing 27, hereinafter termed a freewheel housing and pulley 11 are bolted to adapter 22 by means of screws 28. A freewheel cam 29 abuts a spacer 30 and an annular boss 31 on adapter 22. Cam 29 is keyed to housing 27 for rotation in unison with housing 27. A bushing 32 fixed to cam 29 supports one end of a freewheel race 33. Freewheel clutch members or rollers 34 are positioned between cam 29 and race 33, the rollers being supported against axial motion at one end by means of freewheel cam spacer 30 and at the opposite end by race 33. A ball bearing 35 and an annular oil seal 36 are positioned between housing 27 and race 33, the race 33 being drilled at 37 to permit oil from chamber 26 to lubricate bearing 35. Freewheel race 33 carries splines 38 adapted to cooperate with splines 39 on an overrun pulley adapter 40, the race 33 and adapter 40 being retained in assembled relationship by means of a washer 41 which abuts one end of splines 38 and a bolt 42. An overrun pulley 14 is fixed to adapter 40 by means of bolts or rivets 43. The arrangement of the one-way clutch structure is such that pulley 14 may rotate freely at a faster rate of speed than that of drive pulley 11, but may not rotate slower than pulley 11. As will be hereafter more fully explained, overrun pulley 14 at times rotates in the same direction of rotation as pulley 11 but at a faster speed of rotation than pulley 11. Under other operating conditions pulleys 14 and 11 rotate at the same speed of rotation, the one-way clutch rollers 34 then being effective to lock freewheel race 33 to freewheel housing 27.

In Figure 3 there is shown a two-speed transmission unit 2 adapted to be alternately driven either from pulley 11 or pulley 14 of the power input unit 1 of Figure 2. A transmission case 50 carries a removable cover 51 held in assembled relationship by means of a snap ring 52. A flexible annular seal ring 53 carried by cover 51 contacts housing 50 to prevent leakage of oil from within the chamber 54 enclosed by the housing and cover. Positioned within chamber 54 is a driving torus 55 carrying impeller blades 56 and having a torus cover 57 removably attached thereto and held in assembled relationship by means of a snap ring 58. A flexible seal ring 59 is carried by torus cover 57 in contact with torus 55. Cover 57 and torus 55 rotate as a unit, the cover having spaced recesses about its periphery adapted to cooperate with spaced drive teeth 60 on torus 55 to permit assembly and removal of the torus cover. Torus cover 57 extends outwardly through housing cover 51 to receive a drive pulley 13 splined to torus cover 57 and held in place by means of a snap ring 61. A bushing 62 and a bushing 63 are disposed between torus cover 57 and housing cover 51 and a driven torus shaft 92, respectively. A thrust washer 64 is disposed between housing cover 51 and torus cover 57. Housing cover 51 and torus cover 57 are drilled at 65 and 66 to permit excess oil from bushings 62 and 63 to drain back into the chamber 54. Oil seals 67 and 68 are positioned between housing cover 51 and torus cover 57 and between torus cover 57 and shaft 92, respectively.

A clutch hub 70 splined to shaft 92 carries a pair of driven clutch plates 72 adapted to cooperate with a drive clutch plate 71 splined to torus 55 and axially movable with respect to the torus. A clutch piston 73 is keyed to torus 55 for rotation with torus 55, the key 74 permitting axial motion of piston 73 with respect to torus 55. A Belleville washer 75 carried by torus 55 and held in place by a snap ring 76 yieldably urges piston 73 to engage the clutch plates 71—72, torus cover 51 acting as the clutch backing member when the clutch plates are engaged. A bushing 77 is inserted between clutch piston 73 and shaft 92, the piston 73 being drilled at 78 to admit oil under pressure to the chamber 79. A bushing 80 is positioned between driving torus 55 and shaft 92, and a thrust washer 81 is disposed between driving torus 55 and housing 50, the bushing and thrust washer serving to support the driving torus for rotation. A restricted passage 82 is drilled in drive torus 55 to permit continuous restricted oil flow from chamber 83 to chamber 54. An overspeed dump valve 85 consists of a valve body 86 carried by drive torus 55 and a ball valve 87 yieldably biased by means of a spring 88 to engage its seat 89. In the event that driving torus 55 is accelerated to a rate of rotation greater than a predetermined rate, for example, the speed at which valve 110 shifts, ball valve 87 will be forced from its seat 89 by centrifugal force to permit oil from chamber 83 to pass to chamber 54 through valve 85. A driven torus 90 having blades 91 has its hub splined to driven torus shaft 92 for rotation with shaft 92. A pair of thrust washers 93—94 are disposed between the hub of driven torus 90 and bushing 80 to keep the two tori in a fixed spaced relationship with respect to each other. Pulley 16 and pulley 100 are each fixed to shaft 92 for rotation therewith. Pulley 100 may be a drive pulley for an air conditioning compressor or other accessory. A bushing 95 supports shaft 92 in housing 50, there being an oil seal 96 disposed between housing 50 and the hub 97 of pulley 100. A drilled passage 45 in housing 50 admits oil under pressure from a pump, such as an engine driven pump to drilled passages 46, 47 and 48 in shaft 92 to admit oil under pressure to a chamber 49 between piston 73 and torus drive cover 57. Passage 47 is plugged at one end by a plug 98.

Piston 73 is provided with a bore 101 and ports 78, 102, 103 and 104, there being a speed controlled shift valve 110 disposed in bore 101. Port 78 admits fluid under pressure from chamber 49 to a control chamber 79 beneath valve 110. Valve 110, depending upon its position in bore 101, either admits fluid under pressure from chamber 49 to chamber 83 by way of ports 102 and 103 or blocks the flow of fluid from chamber 49 to chamber 83. A spring 105 seated upon a pin 106 yieldably biases valve 110 to hydraulically connect the two chambers to each other. Spring chamber 107 is hydraulically connected to chamber 83 by port 104 so that fluid pressure in chamber 107 will assist spring 105 in opposing movement of valve 110 against the spring. As hereafter more fully explained, this pressure assist to spring 105 is present under certain conditions and not present under other conditions so that the speed of rotation of piston 73 at which valve 110 moves in one direction is different than the speed of rotation of piston 73 at which valve 110 moves in the opposite direction.

*Operation*

In the preferred arrangement shown, it will be observed that the pitch diameter of pulley 11 is substantially greater than that of pulley 13 and that of pulley 16 is greater than pulley 14. Assuming the vehicle to be at rest with the engine started and running at relatively low r.p.m. spring 105 will be effective to position valve 110 to connect chamber 49 to chamber 83 by way of ports 102 and 103. Oil under pressure is continuously supplied to chamber 49 by way of passages 45, 46, 47 and 48. Chamber 83 is continuously connected to chamber 54 by way of drilled passages 82. Thus at relatively low engine r.p.m., a continuous oil flow is maintained through chambers 49 and 83. Chamber 54 is connected to the engine sump by suitable piping, not shown, but which may be connected to a drain pipe 50a in housing 50. It will be understood that fluid in chamber 83 admitted to spring chamber 107 by piston port 104 will assist spring 105 to position valve 110 to maintain chambers 49 and 83 in fluid flow communication. With this operative condition, Belleville spring 75 is effective to engage the friction clutch such that drive pulley 13 of accessory drive unit 2 is mechanically connected to shaft 92. Due to the fact that the pitch diameter of pulley 11 is greater than that of pulley 13, shaft 92 and pulleys 16 and 100, fixed to the shaft 92, will be rotated at a speed greater than engine speed as determined by the relative pitch diameters of pulleys 11 and 13. Since the diameter of pulley 16 is greater than that of pulley 14, the pulley 14 will be driven at a speed faster than that of shaft 92 as determined by the relative pitch diameters of pulleys 16 and 14. Water pump and fan pulley 18 will be driven somewhat slower than pulley 14 due to the fact that the diameter of the water pump and fan pulley 18 is greater than that of pulley 14. The generator pulley 19 will be driven at a speed greater than pulley 18 as determined by the relative pitch diameters of pulleys 14 and 19. In this relatively slow engine r.p.m. condition of operation, one-way clutch 34 permits pulley 14 to rotate at a greater speed of rotation than pulley 11 in the same direction of rotation as that of pulley 14.

It will readily be understood that all of the accessories are initially driven at a speed greater than engine speed to provide adequate capacity when the engine is idling or operating at relatively low speed as occurs in heavy city traffic conditions.

Assuming the vehicle is speeded up to a predetermined speed, centrifugal force acting upon valve 110 will cause valve 110 to compress spring 105 until ports 102 and 103 are blocked off to interrupt fluid flow from chamber 49 to chamber 83. Fluid in chamber 83 will be gradually emptied from chamber 83 to chamber 54 through port 82. As the fluid in chamber 83 is exhausted, fluid under pressure in chamber 49 will move piston 73 against Belleville spring 75 to release the friction clutch. Upon release of the friction clutch the fluid coupling unit will act as a hydraulic slip clutch of gradually decreasing efficiency with the amount of slip being increased as chamber 83 progressively becomes exhausted of fluid. Due to the slip effect of the fluid coupling unit, the speed of rotation of shaft 92 gradually diminishes until it reaches a speed at which pulley 14 of power input unit 1 rotates at engine crankshaft speed. At this moment, one-way clutch 34 locks up so that power input from the engine crankshaft is by way of pulley 14 and pulley 16 to shaft 92, the drive again being a mechanical drive. Pulley 13 of accessory drive unit 2 continues to be driven by pulley 11 of the power input unit.

Upon completion of the shift from a relatively fast drive of the accessories to a relatively slow drive of the accessories, fluid in spring chamber 107 will be exhausted. Fluid is still conducted to control chamber 79 of valve 110 and assists centrifugal force in maintaining valve 110 in its cut-off position. Due to this arrangement, the engine speed at which a "downshift" from a relatively fast to a relatively slow drive of the accessories occurs in substantially greater than the engine speed at which a shift from relatively slow to relatively fast (upshift) drive of the accessories occurs. This "spread" in the shift point between downshift and upshift prevents undesirable "hunting" between the upshift and downshift condition of operation as might otherwise occur at certain critical engine r.p.m.

It will readily be understood that the present accessory drive arrangement provides for adequate accessory capacity at low engine speed, reduces power consumption at relatively high engine r.p.m. and provides an extremely smooth transition of drive from one ratio to another. The relative speeds at which the various accessory units are driven may be easily and simply controlled to provide desired speeds by selection of pulleys of proper pitch diameter. Standard V belts are used to connect the pulleys.

*Overspeed dump valve*

An overspeed dump ball valve 87 is normally seated upon a conical seat 89 formed on valve housing 86 by action of a spring 88. The valve assembly indicated at 85 is carried by drive torus 55 near the outer periphery of torus 55 so as to be responsive to centrifugal force effect as determined by the speed of rotation of the torus. An exhaust port 84 is drilled in valve housing 86 to permit exhaust of fluid from chamber 83 to chamber 54 by way of port 84 whenever the ball valve 87 becomes unseated. The conical valve seat 89 and spring 88 are so calibrated that the ball will normally remain upon seat 89. In normal acceleration of the vehicle valve 87 will remain seated until the speed of rotation of torus 55 is somewhat higher than the speed of rotation at which shift valve 110 is caused to shift. In a normal moderate acceleration of the vehicle, exhaust of fluid from chamber 83 to chamber 54 is by way of exhaust ports 82. When, however, unusually rapid acceleration of the vehicle is attained by "gunning" the vehicle, the capacity of drain openings 82 is not sufficient to provide a quick dump of fluid from chamber 83. Upon an unusually rapid acceleration of the vehicle and torus 55, valve 87 will ride up on conical seat 89 due to centrifugal force acting upon ball valve 87. This action occurs at a speed of rotation greater than that required to cause shift valve 110 to move against spring 105. Thus, during periods of rapid acceleration, once the shift point for shifting valve 110 is attained, valve 87 will open to assure relatively fast exhaust of fluid from chamber 83. This prevents undesirable overspeeding of the accessory units as might otherwise occur during conditions of very rapid vehicle acceleration.

What is claimed is:

1. A power transmission system including an engine driven power input unit and a power delivery unit, first and second drive connections, respectively, between said power input unit and said power delivery unit for alternately connecting said power delivery unit to said engine through different torque transfer paths, a one-way clutch for permitting overrun of said second drive connection when said first drive connection is effective to transmit drive to said power delivery unit, said power delivery unit including a rotatable housing adapted to be rotatably driven through said first drive connection and an output shaft adapted to be driven through said second drive connection, said one-way clutch being engaged when said second drive connection is effective to drive said output shaft, an impeller in said housing rotatably driven by said housing, a turbine in said housing fixed for rotation with said output shaft, an engageable and releasable friction clutch in said housing having one element driven by said housing and a second element fixed for rotation with said output shaft, a piston disposed within said housing and dividing said housing into first and second chambers, a drain connecting said second chamber to exhaust, means yieldably biasing said piston to engage said friction clutch, a source of fluid under pressure connected to said first chamber, and valve means controlling the flow of fluid from said first chamber to said second chamber, said valve means being effective in one position to hydraulically connect said chambers to each other and effective in a second position to block-off fluid flow from said first chamber to said second chamber, said piston being movable in response to drop in pressure in said second chamber to release said friction clutch, and said impeller and turbine providing a slipping hydraulic clutch in which the clutch slip increases with decrease in fluid in said second chamber to provide smooth engagement of said one-way clutch.

2. A power transmission system including an engine driven power input unit and a power delivery unit adapted to be selectively connected to said engine by said power input unit through first and second torque transfer paths, respectively, means connecting said power input unit to said power delivery unit for driving said power delivery unit through said first torque transfer path, engageable and releasable clutch means associated with said power delivery unit effective upon engagement to transfer torque through said power delivery unit, and one-way clutch means associated with said power input unit, said one-way clutch means being automatically released upon engagement of said first-mentioned clutch means to prevent drive of said power delivery unit through said second torque path and automatically engaged upon release of said first-mentioned clutch means to complete the drive connection between said power input unit and said power delivery unit through said second torque path, said power delivery unit including an output shaft adapted to be alternately driven through said engageable and releasable clutch means or said one-way clutch, said power delivery unit including a housing adapted to be driven through said first torque path, means carried by said housing for engaging said engageable and releasable clutch to establish drive of said output shaft through said first torque path and dividing said housing into first and second chambers, said first-mentioned clutch being disposed in said first chamber, a fluid coupling unit having an impeller driven by said housing and a turbine fixed for rotation with said output shaft disposed in said second chamber, a restricted exhaust port continuously connecting said second chamber to exhaust, a source of fluid pressure connected to said first chamber, and valve means for controlling the flow of fluid from said first chamber to said second chamber, said valve means being effective in one position to connect said chambers to each other to permit engagement of said first-mentioned clutch, said valve means being effective in a second position to block off fluid flow from said first to said second chamber, said fluid coupling unit being effective when said valve is in said last-mentioned position to provide a slipping hydraulic clutch drive of said output shaft, the slip of said hydraulic clutch drive increasing with decrease in the quantity of fluid in said second chamber to provide smooth engagement of said one-way clutch.

3. A power transmission system including an engine driven power input unit and a power delivery unit adapted to be connected to said engine by said power input unit selectively through first and second torque transfer paths, respectively, a drive connection between said power input and power delivery unit for driving said power delivery unit through said first torque transfer path, a second drive connection between said power input and power delivery units adapted to drive said power delivery unit through said second torque transfer path, a clutch associated with said power delivery unit effective to transmit torque through said power delivery unit when engaged, means for controlling the engagement and release of said clutch, and a one-way clutch associated with said power input unit effective upon engagement of said first-mentioned clutch to prevent drive of said power delivery unit through said second torque transfer path, said one-way clutch being effective to establish drive of said power delivery unit through said second torque transfer path upon release of said first-mentioned clutch, and means for controlling the rate of engagement of said one-way clutch comprising a fluid coupling unit having an impeller driven through said first torque path and a turbine connected for rotation with one element of said first-mentioned clutch, a restricted passage connecting said fluid coupling to exhaust, a source of fluid adapted to be connected to said fluid coupling, said means for controlling the release and engagement of said first-mentioned clutch comprising a valve controlling the admission of fluid to said fluid coupling, said fluid coupling providing a slipping hydraulic clutch for controlling the engagement of said one-way clutch when said valve is positioned to block off the flow of fluid to said coupling.

4. A power transmission system including an engine driven power input unit and a power delivery unit, a first drive connection between said units, a second drive connection between said units, a one-way clutch for permitting over-run of said second drive connection when said first drive connection is effective to transmit drive through said power delivery unit, a selectively engageable and releasable clutch for selectively rendering said first drive connection effective and ineffective to transmit torque through said power delivery unit, means yieldably biasing said clutch for engagement, pressure responsive means for releasing said clutch, and speed responsive means for controlling the engagement and release of said clutch, said one-way clutch being automatically engageable to provide drive of said power delivery unit through said second drive connection when said selectively engageable and releasable clutch is released.

5. A power transmission system including an engine driven power input unit and a power delivery unit, a first drive connection between said units, a second drive connection between said units, a one-way clutch for permitting free wheeling of said second drive connection when said first drive connection is effective to transmit power through said power delivery unit, a selectively engageable and releasable clutch for transmitting and interrupting the transmission of power from said first drive connection through said power delivery unit, a clutch piston, means yieldably biasing said piston for engaging said last-mentioned clutch, a source of fluid pressure connected to said piston, and valve means carried by said piston for controlling the release and engagement of said clutch, said one-way clutch being effective to complete said second drive connection for drive of said power delivery unit through said second drive connection upon release of said selectively engageable and releasable clutch.

6. A power transmission system including an engine driven power input unit and a power delivery unit, first and second drive connections, respectively, between said units, a selectively engageable and releasable clutch for transmitting and interrupting the transmission of torque from said first drive connection through said power delivery unit, a clutch piston, means yieldably biasing said piston for engaging said clutch, a chamber between said piston and said clutch, a source of fluid pressure connected to said chamber, a second chamber adjacent said piston at the side of said piston opposite said clutch, valve means for controlling the flow of fluid under pressure from said first-mentioned to said second chamber, said valve means being effective in one position to connect said chambers to each other to permit said biasing means to engage said clutch and effective in a second position to block the flow of fluid between said chambers, said piston being effective when said valve is in said last mentioned position to release said clutch, and a one-way clutch effective when said first-mentioned clutch is engaged to permit free-wheeling of said second drive connection, said one-way clutch being effective when said first-mentioned clutch is released to complete said second drive connection to transmit torque from said engine to said power delivery unit through said second drive connection.

7. A power transmission system including an engine driven power input unit and a power delivery unit, a first drive connection between said units, a second drive connection between said units, a selectively engageable and releasable clutch for transmitting and interrupting the transmission of torque from said first drive connection through said power delivery unit, a clutch piston, means yieldably biasing said piston to engage said clutch, first and second chambers at opposite sides of said piston, respectively, a fluid pressure source connected to said first chamber, valve means for controlling the flow of fluid from said first to said second chamber, said valve means being effective in one position to permit free flow of fluid between said chambers and effective in a second position to prevent flow of fluid from said first to said second chamber, said biasing means being effective in said first position of said valve to engage said clutch, said piston being responsive to fluid pressure in said first chamber to release said clutch when said valve is in said second position, a hydraulic torque transfer unit in said second chamber having one element connected to said first drive connection and a second element connected to said second drive connection, and a one-way clutch effective when said first mentioned clutch is engaged to permit free-wheeling of said second drive connection, said one-way clutch being effective upon release of said first-mentioned clutch to connect said power delivery unit to said engine through said second drive connection.

8. A power transmission system including an engine driven power input unit and a power delivery unit, first and second drive connections between said units, respectively, a selectively engageable and releasable clutch for transmitting and interrupting the transmission of torque from said first drive connection through said power delivery unit, a clutch piston, means yieldably biasing said piston to engage said clutch, first and second control chambers at opposite sides of said piston, respectively, a fluid pressure source connected to said first chamber, speed responsive valve means for controlling the flow of fluid from said first to said second chamber, means yieldably biasing said valve means to connect said chambers to each other in fluid flow relationship, said valve being effective in a second position to block the flow of fluid from said first chamber to said second chamber, said piston being responsive to fluid pressure in said first chamber to release said clutch when said valve means is disposed in said second position, a hydraulic torque transfer unit in said second chamber having one element rotated by said first drive connection and a second element connected for rotation with said second drive connection, a restricted fluid discharge opening in said second chamber, and one-way clutch means effective to permit free wheeling of said second drive connection when said first-mentioned clutch is engaged and effective upon release of said first-mentioned clutch to connect said power delivery unit to said engine through said second drive connection.

9. A power transmission system including an engine driven power input unit and a power delivery unit, first and second flexible drive connections between said units, selectively engageable and releasable fluid pressure controlled clutch means in said power delivery unit for alternately transmitting and interrupting the transmission of torque from said first drive connection through said power delivery unit, and one-way clutch means effective upon engagement of said fluid pressure controlled clutch means to be released to prevent transmission of torque from said power input unit to said power delivery unit through said second drive connection, said one-way clutch being automatically engaged upon release of said fluid pressure controlled clutch means to establish drive of said power delivery unit by said power input unit through said second drive connection, and means for controlling the rate of engagement of said one-way clutch including a fluid coupling unit having an impeller driven through said first drive connection and a turbine rotatable with one element of said fluid pressure controlled clutch, a restricted discharge opening associated with said fluid coupling unit, and a valve effective in one position to prevent admission of fluid to said fluid coupling.

10. A power transmission system including an engine driven power input unit and a power delivery unit, first and second drive connections, respectively, between said power input and said power delivery unit, an engageable and releasable clutch in said power delivery unit effective when engaged to transmit power from said first drive connection through said power delivery unit, an engageable and releasable clutch in said power input unit effective when said first-mentioned clutch is engaged to prevent transmission of power from said power input unit to said power delivery unit through said second drive connection and effective when engaged to transmit power from said power input unit to said power delivery unit through said second drive connection, said second-mentioned clutch being automatically released when said first-mentioned clutch is engaged and automatically engaged when said first-mentioned clutch is released, a hydrodynamic torque transfer mechanism in said power delivery unit, a fluid pressure source, valve means for controlling engagement and release of said first-mentioned clutch and the flow of fluid from said source to said hydrodynamic torque transfer mechanism, said valve means being effective in one position to permit fluid flow from said source to said hydrodynamic torque transfer mechanism and effective in a second position to prevent fluid flow to said hydrodynamic torque transfer mechanism, said hydrodynamic torque transfer mechanism being continuously hydraulically connected to exhaust through a restricted fluid discharge passage.

11. A power transmission system including an engine driven power input unit and a power delivery unit, first and second drive connections, respectively, between said power input unit and said power delivery unit, a friction clutch in said power delivery unit effective when engaged to transmit power from said first drive connection through said power delivery unit, a one-way clutch in said power input unit effective when said friction clutch is engaged to prevent drive of said power delivery unit through said second drive connection and effective when said friction clutch is released to transmit power from said power input unit to said power delivery unit through said second drive connection, a clutch actuating piston in said power delivery unit, means yieldably biasing said piston to engage said friction clutch, control chambers at opposite sides of said piston, respectively, a source of fluid pressure hydraulically connected to one of said control chambers, hydrodynamic torque transfer mechanism positioned in the other of said control chambers, a restricted discharge passage in said other control chamber for permitting continuous discharge of fluid from said other control chamber to exhaust, and valve means for controlling engagement and release of said friction clutch, said valve means being effective in one position to hydraulically connect said control chambers to each other, said valve means being effective in a second position to prevent fluid flow from said one control chamber to said other control chamber.

12. A power transmission system including an engine driven power input unit and a power delivery unit, first and second drive connections, respectively, between said power input unit and said power delivery unit, a friction clutch in said power delivery unit effective when engaged to transmit power from said first drive connection through said power delivery unit, a one-way clutch in said power input unit effective when said friction clutch is engaged to prevent drive of said power delivery unit through said second drive connection and effective when said friction clutch is released to transmit power from said power input unit to said power delivery unit through said second drive connection, a clutch actuating piston in said power delivery unit, means yieldably biasing said piston to engage said friction clutch, first and second control chambers at opposite sides of said piston, respectively, a source of fluid pressure hydraulically connected to said first control chamber, a hydraulic power transmitting unit in said second control chamber, a restricted fluid discharge passage for permitting continuous discharge of fluid from said second control chamber, a fluid pressure source hydraulically connected to said first control chamber, a valve carried by said piston for controlling the flow of fluid from said first to said second control chamber, means yieldably biasing said valve to hydraulically connect said control chambers to each other, said valve having a first control chamber associated therewith and hydraulically connected to said first-mentioned control chamber and a second control chamber associated therewith and hydraulically connected to said second mentioned control chamber, said valve being movable against said valve biasing means to prevent the flow of fluid from said first-mentioned to said second-mentioned control chamber.

13. A power transmission system including an engine driven power input unit and a power delivery unit, first and second drive connections, respectively, between said power input unit and said power delivery unit, a friction clutch in said power delivery unit effective when engaged to transmit power from said first drive connection through said power delivery unit, a one-way clutch in said power input unit effective when said friction clutch is engaged to prevent drive of said power delivery unit through said second drive connection and effective when said friction clutch is released to transmit power from said power input unit to said power delivery unit through said second drive connection, a clutch actuating piston in said power delivery unit, means yieldably biasing said piston to engage said friction clutch, first and second control chambers at opposite sides of said piston, respectively, a source of fluid pressure hydraulically connected to said first control chamber, a hydraulic power transmitting unit in said second control chamber, a restricted fluid discharge passage for permitting continuous discharge of fluid from said second control chamber, a fluid pressure source hydraulically connected to said first control chamber, and a speed responsive valve carried by said piston for controlling the flow of fluid from said first to said second control chamber, means yieldably biasing said valve to hydraulically connect said control chambers to each other, said valve being responsive to a predetermined speed of rotation of said piston to block the flow of fluid from said first to said second control chamber.

14. A power transmission system including an engine driven power input unit and a power delivery unit, first and second drive connections, respectively, between said power input unit and said power delivery unit, a friction clutch in said power delivery unit effective when engaged to transmit power from said first drive connection through said power delivery unit, a one-way clutch in said power input unit effective when said friction clutch is engaged to prevent drive of said power delivery unit through said second drive connection and effective when said friction clutch is released to transmit power from said power input unit to said power delivery unit through said second drive connection, a clutch actuating piston in said power delivery unit, means yieldably biasing said piston to engage said friction clutch, first and second control chambers at opposite sides of said piston, respectively, a source of fluid pressure hydraulically connected to said first control chamber, a hydraulic power transmitting unit in said second control chamber, a restricted fluid discharge passage for permitting continuous discharge of fluid from said second control chamber, a fluid pressure source hydraulically connected to said first control chamber, a speed responsive valve carried by said piston for controlling the flow of fluid from said first to said second control chamber, means yieldably biasing said valve to hydraulically connect said control chambers to each other, said valve being responsive to a predetermined speed of rotation of said piston to block the flow of fluid from said first to said second control chamber, and a speed responsive valve carried by the impeller of said hydrodynamic power transmitting device effective upon acceleration of said impeller above a predetermined rate of acceleration to permit rapid discharge of fluid from said second control chamber.

References Cited in the file of this patent
UNITED STATES PATENTS

| | | |
|---|---|---|
| 1,983,827 | Winther et al. | Dec. 11, 1934 |
| 2,694,937 | Birbaum | Nov. 23, 1954 |
| 2,903,083 | Kelley | Sept. 8, 1959 |

FOREIGN PATENTS

| | | |
|---|---|---|
| 275,917 | Switzerland | Sept. 1, 1951 |